(12) United States Patent
Watada et al.

(10) Patent No.: US 6,225,396 B1
(45) Date of Patent: May 1, 2001

(54) RESIN COMPOSITE AND PROCESS FOR PRODUCING THE SAME

(75) Inventors: Kazuo Watada; Yoichi Fujioka, both of Sendai; Hiroko Tanda; Koji Enokida, both of Kokubu; Saeki Nakamura, Sendai, all of (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/361,730

(22) Filed: Jul. 27, 1999

Related U.S. Application Data

(62) Division of application No. 08/999,369, filed on Dec. 29, 1997.

(51) Int. Cl.$^7$ ...................................................... C08K 3/00
(52) U.S. Cl. .......................................... 524/492; 524/493
(58) Field of Search ..................................... 524/492, 493

(56) References Cited

U.S. PATENT DOCUMENTS

| | | |
|---|---|---|
| 4,711,916 | * 12/1987 | Hagiwara et al. ................... 523/223 |
| 4,766,162 | 8/1988 | Hamamoto et al. . |

FOREIGN PATENT DOCUMENTS 57-151308    9/1982   (JP) .

* cited by examiner

*Primary Examiner*—Edward J. Cain
(74) *Attorney, Agent, or Firm*—Hogan & Hartson, LLP.

(57) ABSTRACT

A composite resin and fillers for molding electronic and structural parts that have high dimensional accuracy, are free of surface defects stemming from the mold and are suitable for mass production. The preferred composite contains 10 to 70 vol-% of a thermosetting resin with the balance consisting of filler particles having an average diameter of 40 $\mu$m or less. The final molded article has pores of 15 to 80 $\mu$m in diameter occupying between 3 and 30% of the area of a cross-section.

7 Claims, 3 Drawing Sheets

RESIN COMPOSITE AND PROCESS FOR PRODUCING THE SAME

This is a division of application Ser. No. 08/999,369 filed Dec. 29, 1997, which application is hereby incorporated by reference in its entirety.

FIELD OF THE INVENTION

The present invention relates to a composite of resin and fillers used in electronic parts and structural parts and to a process for producing the same.

BACKGROUND OF THE INVENTION

Methods of injection molding and heat press forming are used for producing parts with a predetermined shape from a thermosetting resin such as epoxy resin, phenol resin or the like. In the method of injection molding, a resin slurry is poured into a mold with a predetermined shape and then thermally hardened in it. This is widely used as the most commonly molding method for the resins.

A resin composite is formed by mixing synthetic resins with various kinds of inorganic powders, improving hardness and strength rather than a molded body from only resins (see Japanese Patent Publication No. 57-151308 A, 1982). Generally, the resin composite can also be produced by injection molding or heat compression molding method in the same manner as for the resin above.

In injection molding and heat compression molding, however, the resin should be heated in a mold for molding, so that the mold is heated at high temperature. As a result, the thermal deformation of the mold has made it difficult to improve the dimensional accuracy of the resin composite.

Further, the mold used in these production methods must make use of materials with less thermal deformation and must have a shape with a gate and a slag gate for molten starting materials, thus such a special mold has been required. For this reason, use of these production methods has the problem of cumbersome procedures in producing various products in small amounts each, thus causing the production costs to be high.

Furthermore, heating and hardening carried out simultaneously with molding in a mold in one cycle in the above production method make it difficult to reduce the time required for producing products.

In addition, in the case of injection molding of thermosetting resin, resin left in a liner through which molten resin is introduced into the mold should be discarded because it cannot be reused or reproduced. Therefore, a high proportion of starting materials should be discarded in the case of a molded body with relatively small dimension, resulting in low yield. Hence, the cost of the starting materials is rendered high relative to the production cost, and the cost per product is therefore high.

In the case of the most common injection molding, surface defects having uneven portions are generated on the surface of the resulting molded body during injection molding. Examples of such defects are concave weld lines, projected lines or burrs occurring along the connecting portion at which separable half-molds are attached, tapping defects caused by knock-out pins occurring upon release of a product from the mold, and adherent portions of the resin left in a gate formed in a inlet of the mold. Such surface defects worsen qualities in outward appearance and cause a reduction in yield of the products.

The surface of the molded body formed by conventional injection molding or heat compression molding method is shaped by a mold surface, so that the surface of the body is finished to be smooth. For certain utilities, the surface is so smooth that it is necessary to prevent reduction of the bonding strength of solder applied onto the surface or separation of a printed film with characters or patterns from the surface.

In obtaining a porous molded body by conventional injection molding or heating compression molding, it is further difficult to secure and distribute a predetermined amount of pores uniformly inside of the molded body. That is, if the thermosetting resin is a condensation type resin, a hardening agent should be added to the resin in order to initiate hardening of the resin by chemical reaction. For example, if phenol novolak resin is used as thermosetting resin, a hardening agent such as hexamethylene tetramine is used, and hardening occurs by condensation reaction in which hexamethylene tetramine is decomposed by heating to form aldehyde which is then attacks a hydroxyl group in the phenol to lead to cross-linking. The hexamethylene tetramine is decomposed to generate carbon dioxide, ammonia or gases of water etc. along with aldehyde. And in injection molding, these gases in the condensation reaction process prevent pressure transfer required for molding, thus causing moldability to be lowered. For this reason, processing such as breathing is usually carried out during molding, and as a result, pores are hardly observed in the inside and on the outer face of the resin composite.

The porous composite is useful for a sliding member; however, the problem with use of such resin composite with less pores as sliding member is that it is badly worn due to frictional heat caused by sliding with the opposite member, because the thermal conductivity of thermosetting resin present in the sliding face is not high.

To improve the durability and longevity of the sliding members, therefore, it is necessary to apply a lubricant etc. onto the sliding face and to further supply it during use.

On the other hand, in the molding method according to conventional injection molding, the amount of fillers incorporated is limited to about 20 to 30 vol-% and there was a limit to its further increase. That is, the incorporation of a larger amount of fillers raises the viscosity of molten resin to worsen flow characteristics. Residual stress thus results, and the dimensional accuracy of the molded body is deteriorated, and defects such as cracks, warp, etc. are generated.

As described above, use of injection molding and heat compression molding has a limit to the increasing of the amount of fillers incorporated into the composite, and therefore, it is also difficult to improve the thermal resistance, tracking resistance of the composite. In use of the molded body according to the conventional molding method, there is a limit to its application to parts for safety devices etc. requiring characteristics such as high resistance to heat and tracking.

SUMMARY OF THE INVENTION

An object of the present invention is to provide a resin composite having high dimensional accuracy of the molded body, being free of surface defects attributable to a mold in molding and being capable of being easy molded and mass-produced, as well as a process for producing the same.

Another object of the present invention is to provide a resin composite which is a molded body having appropriate surface roughness suitable for solder bonding and film adhering, as well as a process for producing the same.

Another object of the present invention is to provide a porous resin composite which is a molded body having desired porosity, particularly a sliding member having resistance to wear and heat and long lifetime to wear, as well as a process for producing the same.

Another object of the present invention is to provide a process for producing a resin composite having high filler contents and high moldability.

Another object of the present invention is to provide a process for producing a resin composite having high filler content and high moldability, particularly a composite with improvements in resistance to heat and tracking resistance of the molded body.

To achieve the above objects, the resin-filler composite of the present invention is a molded body composed of 10 to 70 vol-% thermosetting resin and the balance being fillers with an average particle diameter of 40 μm or less.

The process for producing the resin composite according to the present invention involves preparing a compressed compact at ordinary temperature from a mixture of thermosetting resin powder and fillers, and then heating the compressed compact without applying pressure thereby hardening the resin to obtain the resin composite.

The composite of the present invention is less in deformation because the compressed compact is formed at ordinary temperature without heating the compact, and the dimensional accuracy of a molded body after hardening can be in the range of ±2.0% relative to the central standard value.

The composite of the present invention comprises resin particles and filler particles dispersed around said resin particles in the composite structure.

In the structure of the composite of the present invention, the composite contains a porous body having the pores of 15 to 80 μm in average diameter in a amount of 3 to 30% of pores in terms of opening area ratio.

The process for producing a resin composite according to the present invention separate a step of compression molding for defining shape and a step of hardening the compressed compact by merely heating. This production process is highly efficient and highly productive for producing the molded body. Because the compression molding method can be carried out at ordinary temperature, small surface defects which have occurred attributable to conventional injection molding and hot compression molding are not formed on the surface of the molded body.

The composite according to the process of the present invention has suitable surface roughness because the suitable roughness of a surface formed by press forming at ordinary temperature is maintained even after thermal hardening without application of pressure.

The composite of the present invention can be rendered porous having desired porosity because the compressed compact molded by compression molding at ordinary temperature has desired porosity and it is then thermally hardened while maintaining the inside pores in the absence of compression.

Because the composite of the present invention is formed by compression molding at ordinary temperature, filler content can be arbitrarily increased, while the composite can have high moldability.

Because the filler content can be increased, the composite, which can constitute a molded body which is improved in resistance to heat and tracking, can be obtained.

BEST MODE FOR CARRYING OUT THE INVENTION

Figure 1:
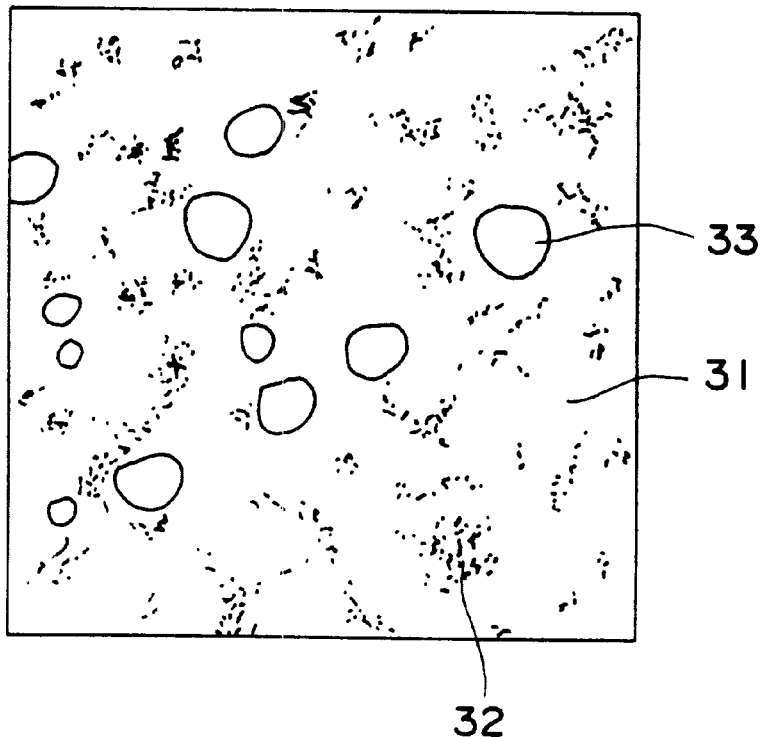
FIG. 1 shows a schematic microstructure of the resin composite of the present invention.

The process for producing a resin composite comprises steps of mixing thermosetting resin powder with fillers having an average particle diameter of 40 μm or less; compression molding this mixed powder to form a predetermined shape at ordinary temperature; and heating the compressed compact after released from the mold to be hardened at 100 to 250° C. into a hardened molded body, the molded resin composite being thus produced.

In the first mixing step, the thermosetting resin powder and filler powder are mixed at the indicated predetermined ratio. The resin which can be used in the present invention is a thermosetting resin to be hardened by heating after compression molding, and it is selected from a wide variety of condensation type resins such as epoxy-based, phenol-based, melamine-based, polyester-based resins, and the like.

Although this resin is thermosetting resin, it should be uncured or semi-cured powder in order to effect its uniform mixing with filler powder and subsequent cold compression molding.

The fillers added to the resin powder are selected suitably depending on the desired use of the molded body, and powder or fibers of inorganic or organic materials may be used. The inorganic materials include various metals and glasses or composite compounds thereof, such as metal oxides, carbides, nitrides, and the like.

For example, metals such as Au, Ag, Cu, Ni, Al, Fe, etc. can be used to confer strength or electric conductivity and magnetism on the composite.

Fillers can also use alumina ($Al_2O_3$) and silica ($SiO_2$). These fillers are useful for conferring wear characteristics on the resin composite, and the resin composite can be used for porous sliding members.

Further, fibers such as glass fibers and carbon fibers may also be used as the fillers to reinforce the resin composite.

As fillers, powder of ferrite or other magnetic materials may be used while the resin composite can be used as ferromagnetic materials or magnets. Other examples of fillers include calcium carbonate, barium carbonate and mica.

The organic materials which may be used include resin fibers (e.g. polyester fibers and nylon fibers), resin powder and resin particles.

Also, the fillers are required to be 40 μm or less in average particle diameter. This is because if the average diameter exceeds 40 μm, the surface of the resulting molded body is roughened and its outer appearance is also worsened, so that it cannot be practically used. The lower limit of the average diameter is about 0.1 μm.

In the process for producing the resin composite according to the present invention, a blend comprising 10 to 70 vol-% of thermosetting resin and the remainder fillers are required. If the amount of thermosetting resin is less than 10 vol-%, the strength of the resulting resin composite is low and thus not practical. On the other hand, if the amount of resin exceeds 70 vol-%, the above dimensional accuracy cannot be obtained due to occurrence of softening or melting of the resin at the time of thermal hardening. Moreover, the amount of resin incorporated is preferably in the range of 10 to 40 vol-%.

Then, the second step lies in compression molding of the resulting starting mixed powder at ordinary temperature. This step can use conventional press molding methods. The press molding method similar to the conventional powder compression molding method can be adopted in this step. As a press mold, a die having a hollow portion and upper and lower punches inserted into the die can be used. In this case, the starting mixed powder described above is filled in the space formed between the upper and lower punches within the die and dencified by pressurizing the upper and lower punches with hydrostatic pressure, and it is shaped dependently on the end surfaces of the upper and lower punches to obtain a compressed compact.

The materials of the above molds such as dies and upper and lower punches etc. can make use of cold tool alloyed steels used for general cold press working, and no special materials are required, and the use of hot tool steels and super-alloys would be more preferable if these are available. In addition, the mold can have an inside shape to achieve the shape of the final product, and it is not required to have so complicated a shape as required in conventional hot press. Further, a shape with steps or through-holes can be easily formed by press forming using a multistep press, pins, etc.

This press forming is carried out at ordinary temperature. This can prevent thermal deformation of the mold, thus permitting a compressed compact to be formed with high dimensional accuracy. Because this press forming can significantly reduce the surface defects attributable to the mold, the compact can be sent directly to the subsequent thermosetting step. A plurality of compressed compact obtained by compression molding may be released one after another from molds, thus making the molding operation very efficient.

In the subsequent thermosetting step, the compact after cold press forming is heated without application of pressure whereby the resin component are polymerized and is thus hardened into a molded body. Heating for hardening is carried out at atmospheric pressure in a batch or continuous furnace equipped with electric heaters. The molded body is kept under heating conditions suited to the hardening temperature of the resin in the furnace. Conditions such as temperature, time, etc. in hardening can be easily selected depending on the properties of the resin used for the molded body, particularly on hardening temperature, such that the resin is not deformed and sufficiently thermally hardened, while the worsening of dimensional accuracy due to resin melting is prevented.

Thermal hardening can be effected at a suitable temperature in the range of 100 to 250° C. in a continuous furnace. The continuous furnace enables continuous and easy processing of a great many of molded bodies.

According to the present invention, the starting mixed powder of thermosetting resin and fillers is compression molded at ordinary temperature so that the compact is not deformed at the time of molding, and hardening is carried out without application of pressure so that it can be molded with high dimensional accuracy. Accordingly, a product of high dimensional accuracy within ±2.0% as described above can be obtained.

By dimensional accuracy referred to herein it is meant that either of the following two features is satisfied.

The first feature is that in case a predetermined mold dimension is normalized as the center value, and the ratio of the difference in the dimension of the final product, relative to the center value, is assumed to be dimensional accuracy, this dimensional accuracy should be within the range of ±2.0%.

The second feature is that in case dimensional accuracy is determined using final products only, the average dimension determined for the same position of 5 or more final products having the same shape is defined as the center standard value, and the ratio of the difference in respective measurements, relative to this center standard value, is defined as dimensional accuracy, and it is meant that this dimensional accuracy should be within the range of ±2.0.

By using the resin composite material of the present invention and the process for producing the same, surface defects attributable to the mold in injection molding or hot compression molding are not generated, and thus the molded body can achieve excellent surface characteristics.

The process according to the present invention comprises compression molding at ordinary temperature, so it is advantageous in that because this mold does not require thermally resistant materials and shape, the molded body can be produced easily at low costs. Further, the molded body can be produced very efficiently using the continuous furnace in the thermosetting step where the molded body after released from the mold is thermally hardened.

Further, where the resin composite powder of the present invention is subjected to powder compression molding, the thermoplastic resin is preferably granulated particles being mixed with fillers and having a lower specific gravity than the fillers mixed. By preliminarily granulating the starting power so as to enable powder compression molding, an excellent molded body can be obtained in the process of the present invention. Then, the molded body using such granules is thermally hardened whereby the fine filler particles can be distributed around the granular resin. As shown schematically in FIG. 1, 10 to 70 vol-% thermosetting resin constitutes resin portion 31 around which fillers 32 with an average particle diameter of 40 $\mu$m or less are distributed. This can be easily observed by a optical microscope or a electron microscope (SEM).

The composite obtained in the process of the present invention can form a porous body with pores being uniformly distributed inside the resin composite. The condensation type resin described above generate a gas during thermal hardening, and the gas is contained as such inside of the molded body whereby a suitable amount of pores 33 can be easily obtained.

This porous resin composite is used preferably in sliding members. The composite as sliding members is preferably that having pores with an average particle diameter ranging from 15 to 80 $\mu$m, and the area of the pores in it is preferably in the range of 3 to 30%. This is because if the average diameter of pores is less than 15 $\mu$m, heat dissipation properties are lowered and frictional heat is raised, and the resin components present in the sliding face adhere and worn, and the resin fraction in the composite is carbonized by frictional heat whereby strength is lowered and there occurs wearing with the opposite sliding material. On the other hand, if pores are larger than 80 $\mu$m in average particle diameter, inconvenience such as swelling in outward appearance occurs after thermal hardening, so that the desired dimensional accuracy cannot be maintained and further deflective strength is significantly lowered.

This is because if the pore area ratio in it is less than 3%, the effect of increasing heat dissipation characteristics is small and the effect of raising sliding characteristics is also small, while if it exceeds 30%, its deflective strength drops to 80 MPa or less and thus it cannot be used as sliding member.

To determine volume percentages of the thermosetting resin and fillers in the composite, the composite is divided into the resin portion and filler portion, and the volume percentage of the resin can be defined as a ratio of the area of the resin portions to the measured total sectional area, and the volume percentage of the fillers as a ratio of the area of the filler portions.

Each volume percentage according to this definition is determined by analysis of the resin portion and filler portion with an image analysis apparatus after an arbitrary cut section in the molded body is magnified under a metallurgical optical microscope or electron microscope (SEM).

As the particle diameter of fillers, the particle diameters of fillers present in the total area in the measured section are measured to take an average. If the fillers are fibrous or acicular particles, the average particle diameter is determined assuming that their major axes are particle diameters.

Inevitable impurities such as Cl, P, Na, Al, Si, Sr, Mg, Zr, Fe, Co, Cu, Ta can also be included in the resin composite of the present invention, and even if these are mixed in an amount of 0.1 wt % on the total amount, there is no problem with characteristics. Other impurities such as metal elements can also be mixed in trace amounts depending on the production process.

The resin composite comprising rigid particles e.g. ceramic powder such as alumina, silica, silicon carbide, etc. as fillers is utilized as sliding members with high resistance to wear. These fillers can improve the thermal resistance of the resin-ceramic composite produced by the above process, and according to this process, a resin composite with heat distortion temperature of 150° C. or more can be produced and used in members requiring thermal resistance.

Further, it was found that as the average diameter of ceramic powder is decreased, tracking resistance can be improved to a high value of 250 V or more.

According to the process of the present invention as described above, the resin composite having very high dimensional accuracy can be produced easily, and further the product can demonstrate high reliability with high added value. Such resin composites can be used in any wide variety of applications as electronic parts, particularly functional elements having functions such as electric conductivity, magnetism and dielectric, and as structural and machinery parts such as automobile parts, office instrument parts and sliding parts.

Particularly, the composite can be vessel-shaped for use in a casing and cover for accommodating various electrical elements such as resistor, thermostat, temperature fuse.

The composite can be utilized as wire guides for dot printers by virtue of high resistance to wear and accurate moldability. An example making use of thermal resistance possessed by the resin and fillers includes a support for an element having a heating part in thermal head printers and the like.

The porous composite is used in various sliding members such as motor bearing, spacer etc. and guide members widely used in office instruments etc. Further, the porous body can be applied to an absorption wick in a liquid mosquito-repellent.

For the functional elements described above, the composite using magnetic materials such as ferrite as fillers can be used as magnets, and the composite using electrically conductive metals such as copper, silver and nickel as fillers can be used as electrically conductive elements

EXAMPLES

Example 1

In a first example, epoxy resin powder and phenol resin powder were selected as thermosetting resin, and silica ($SiO_2$) and alumina ($Al_2O_3$) were selected as fillers, and the mixing amount of these starting materials and the average particle diameters of the fillers were prepared as shown in Tables 1 to 4. Further, these starting materials were used to produce granules capable of pressing powder, and the granules from the respective starting materials were compressed in molds at ordinary temperature to form compressed compacts having been tablet-shaped in the mold dimension of 20 mm outer diameter×1 mm thickness. The compressed compacts were released from the molds and hardened by heating at a temperature of 100 to 200° C. under atmospheric pressure to provide respective 20 hardened compressed compacts for test specimens.

The outer diameters of respective 20 test specimens thus obtained were determined. Tables 1 to 4 show the dimensions of the measured test specimens with the largest difference from the central standard value of the mold dimension of 20 mm. Table 1 shows the determined dimension of the test specimen with a combination of epoxy resin-silica ($SiO_2$); Table 2, that of a combination of epoxy resin-alumina ($Al_2O_3$); Table 3, that of a combination of phenol resin-silica; and Table 4, that of a combination of phenol resin-alumina.

According to Tables 1 to 4, as the amount of resin is lowered to be less than 10 vol-%, the dimensional accuracy is high, but both the compressed compact and hardened molded body are low in strength and thus not practical. On the other hand, the hardened body with resin exceeding 70% is deformed due to resin melting or softening during thermal hardening, and the dimension is 20.1 mm or more relative to the central standard value of 20 mm, and this is outside of the range of ±2.0. If the fillers in the hardened body have particles whose diameter exceeds 40 μm, the hardened bodys decreased in surface roughness, outward appearance and surface characteristics in spite of its high dimensional accuracy.

On the other hand, it is understood that the examples of the present invention where the amount of the resin is 10 to 70 wt-% and the particle diameters of the fillers are 40 μm or less have dimensions in the range of 19.9 to 20.1 mm to achieve dimensional accuracy ±2.0%.

TABLE 1

| Filler particle | | Dimension (mm) | | | | |
|---|---|---|---|---|---|---|
| diameter μm | | 6 | 10 | 40 | 50 | 60 |
| Resin | 5 | 19.90 | 19.88 | 19.86 | 19.85 | 19.89 |
| amount | 10 | 19.96 | 19.95 | 20.03 | 20.03 | 20.08 |
| Vol-% | 20 | 19.98 | 19.99 | 19.99 | 20.07 | 20.16 |
| | 30 | 20.01 | 20.03 | 20.04 | 20.12 | 20.20 |
| | 60 | 20.03 | 20.07 | 20.07 | 20.15 | Highly deformed |
| | 70 | 20.07 | 20.09 | 20.08 | 20.18 | Highly deformed |
| | 80 | 20.09 | 20.11 | 20.14 | 20.23 | Highly deformed |

TABLE 2

| Filler particle diameter μm | | Dimension (mm) | | | | |
|---|---|---|---|---|---|---|
| | | 6 | 10 | 40 | 50 | 60 |
| Resin amount Vol-% | 5 | 19.87 | 19.89 | 19.83 | 19.88 | 19.90 |
| | 10 | 19.92 | 19.94 | 19.91 | 19.93 | 19.95 |
| | 20 | 19.98 | 19.97 | 19.93 | 19.92 | 20.10 |
| | 30 | 20.00 | 19.96 | 19.93 | 19.90 | 20.28 |
| | 60 | 20.03 | 20.05 | 20.02 | 19.88 | 20.25 |
| | 70 | 20.04 | 20.10 | 20.04 | 20.13 | 20.28 |
| | 80 | 20.10 | 20.11 | 20.20 | 20.18 | Highly deformed |

TABLE 3

| Filler particle diameter μm | | Dimension (mm) | | | | |
|---|---|---|---|---|---|---|
| | | 6 | 10 | 40 | 50 | 60 |
| Resin amount Vol-% | 5 | 19.89 | 19.83 | 19.84 | 19.90 | 19.88 |
| | 10 | 19.95 | 19.96 | 19.93 | 19.94 | 19.97 |
| | 20 | 19.97 | 19.98 | 19.95 | 20.06 | 19.93 |
| | 30 | 20.02 | 19.99 | 19.92 | 20.10 | 19.90 |
| | 60 | 19.98 | 19.97 | 20.06 | 20.11 | 20.13 |
| | 70 | 20.08 | 20.04 | 19.94 | 20.16 | 20.18 |
| | 80 | 20.12 | 20.06 | 20.11 | 20.14 | 20.15 |

TABLE 4

| Filler particle diameter μm | | Dimension (mm) | | | | |
|---|---|---|---|---|---|---|
| | | 6 | 10 | 40 | 50 | 60 |
| Resin amount Vol-% | 5 | 19.95 | 19.92 | 19.90 | 19.86 | 19.84 |
| | 10 | 19.98 | 19.94 | 19.94 | 19.92 | 19.95 |
| | 20 | 19.95 | 19.96 | 19.94 | 19.98 | 19.97 |
| | 30 | 19.92 | 19.98 | 19.96 | 19.95 | 19.94 |
| | 60 | 20.09 | 20.04 | 19.93 | 19.94 | 20.10 |
| | 70 | 20.03 | 20.08 | 19.92 | 19.87 | 20.14 |
| | 80 | 20.10 | 20.11 | 19.88 | 19.88 | 20.13 |

Figure 2:
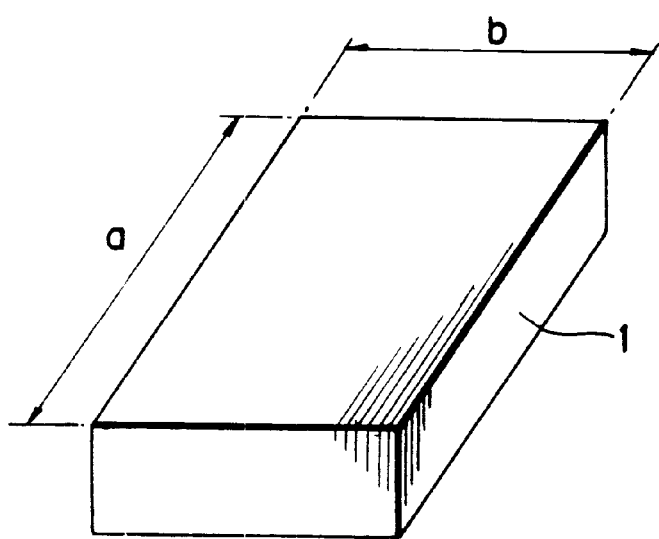
FIG. 2 shows a schematic view of a test specimen comprising the resin composite of the present invention.
Figure 3:
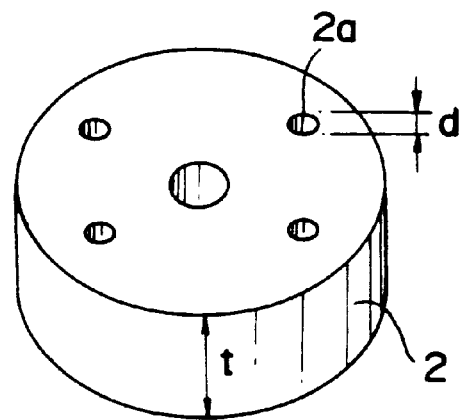
FIG. 3 shows a schematic view of a test specimen comprising the resin composite of the present invention.

Rectangular parallelepiped test specimens of resin composite as shown in FIG. 2 and test specimens of disks having through-hole 2a as shown in FIG. 3 were prepared respectively from the starting materials i.e. 40 vol-% epoxy resin and 60 vol-% silica with an average particle diameter of 10 μm as fillers. Long side "a" and short side "b" for 5 regular parallelepiped test specimens, as shown in FIG. 2, were measured. Thickness "t" and hole diameter "d" as shown in FIG. 3 were measured for 5 disk-shaped test specimens. The dimensional accuracy obtained by comparing each measurement length with the central standard values of the mold size is shown in Table 5 (for the rectangular parallelepiped body) and Table 6 (for the disk). The results shows that the dimensional accuracy of any test specimens is within the range of 2.0% of the central standard values.

TABLE 5

| | Measurement part | | | |
|---|---|---|---|---|
| | Long side "a" | | Short side "b" | |
| | Mold dimension | | | |
| | 34.43 mm | | 23.05 mm | |
| | Product dimension (mm) | Dimensional accuracy (%) | Product dimension (mm) | Dimensional accuracy (%) |
| 1 | 34.436 | 0.02 | 23.056 | 0.03 |
| 2 | 34.422 | −0.02 | 23.050 | 0.00 |
| 3 | 34.429 | 0.00 | 23.040 | −0.04 |
| 4 | 34.439 | 0.03 | 23.052 | 0.01 |
| 5 | 34.430 | 0.00 | 23.046 | −0.02 |

TABLE 6

| | Measurement part | | | |
|---|---|---|---|---|
| | Thickness "t" | | Hole diameter "d" | |
| | Mold dimension | | | |
| | 8.20 mm | | 2.66 mm | |
| | Product dimension (mm) | Dimensional accuracy (%) | Product dimension (mm) | Dimensional accuracy (%) |
| 1 | 8.211 | 0.13 | 2.670 | 0.38 |
| 2 | 8.198 | −0.02 | 2.666 | 0.23 |
| 3 | 8.202 | 0.02 | 2.668 | 0.30 |
| 4 | 8.208 | 0.10 | 2.665 | 0.19 |
| 5 | 8.206 | 0.07 | 2.665 | 0.19 |

The above dimensional accuracy was determined by comparing each measurement value with the mold size as the central standard value, and it was further found that dimensional accuracy determined using the average of all measurements as the center value is also within ±2.0%.

Example 2

Resistance to Wear of Porous Body

Starting materials in combination with phenol resin and carbon fibers were mixed at the mixing ratios shown in Tables 7 and 8 and then compressed into spheres at ordinary temperature in the same manner as in Example 1. After released from the molds, the spheres were hardened by heating at a temperature of 80 to 250° C. to produce balls of the composite as test specimens to be examined for wear resisting characteristics. The resulting test specimens were cut and the cut area was observed under a microscope, and a photograph was taken of the section of the test specimen, and the average diameter of pores and the percentage of pores in the section were determined by image analysis system.

This test was carried out using ball-on-disk techniques in which a ball of the composite was pressed onto a rotating disk made of alumina or stainless steel and then wear resisting characteristics were evaluated with both abraded loss of the ball and disk determined after the predetermined period of time.

Tables 7 and 8 show the abrasion wear. From these results, it is understood that the test specimens of the composite with pores of 15 to 80 μm in average diameter and with a pore content of 5 to 30% in the sectional area demonstrate high resistance to wear and good sliding properties.

TABLE 7

| | | Comparative Example | | | | Example | | | |
|---|---|---|---|---|---|---|---|---|---|
| Sample No. | | 1 | 2 | 3 | 4 | 5 | 6 | 7 | 8 |
| Mixing ratio | Phenol novolak resin | 70 | 50 | 40 | 80 | 60 | 50 | 40 | 30 |
| | Carbon fiber (vol-%) | 30 | 50 | 60 | 20 | 40 | 50 | 60 | 70 |
| Average pore diameter ($\mu$m) | | — | 10 | 70 | 100 | 35 | 30 | 25 | 15 |
| Content of pores in the sectional area (%) | | — | 2 | 33 | 35 | 22 | 15 | 12 | 5 |
| Specific abrasion wear of disk ($10^{-3}$mm$^3$/kg/km) | | 2 | 5 | 2 | 0 | 0 | 0 | 0 | 0 |
| Specific abrasion wear of ball ($10^{-3}$mm$^3$/kg/km) | | 25 | 135 | 15 | 235 | 4 | 2 | 2 | 3 |

The disk material is alumina ceramic.

TABLE 8

| | | Comparative Example | | | | Example | | | |
|---|---|---|---|---|---|---|---|---|---|
| Sample No. | | 1 | 2 | 3 | 4 | 5 | 6 | 7 | 8 |
| Mixing ratio | Phenol novolak resin | 70 | 50 | 40 | 80 | 60 | 50 | 40 | 30 |
| | Carbon fiber (vol-%) | 30 | 50 | 60 | 20 | 40 | 50 | 60 | 70 |
| Average pore diameter ($\mu$m) | | — | 10 | 70 | 100 | 35 | 30 | 25 | 15 |
| Content of pores in the sectional area (%) | | — | 2 | 33 | 35 | 22 | 15 | 12 | 5 |
| Specific abrasion wear of disk ($10^{-3}$mm$^3$/kg/km) | | 5 | 2 | 0 | 2 | 0 | 0 | 0 | 0 |
| Specific abrasion wear of ball ($10^{-3}$mm$^3$/kg/km) | | 105 | 75 | 18 | 15 | 3 | 2 | 2 | 2 |

The disk material is stainless steel.

Example 3

Thermal Resistance

Starting materials i.e. phenol resin and alumina in the amounts and with the diameters of alumina particles as shown in Table 9 were pressed into bars, and the resulting pressed compacts were hardened by heating them in the range of 80 to 250° C. (actually at 150° C.).

Heat distortion temperature was determined using the resulting bar-shaped test specimens in accordance with Japanese Industrial Standard (JIS) K7207. Table 9 shows measured data of the heat distortion temperatures.

Figure 4:
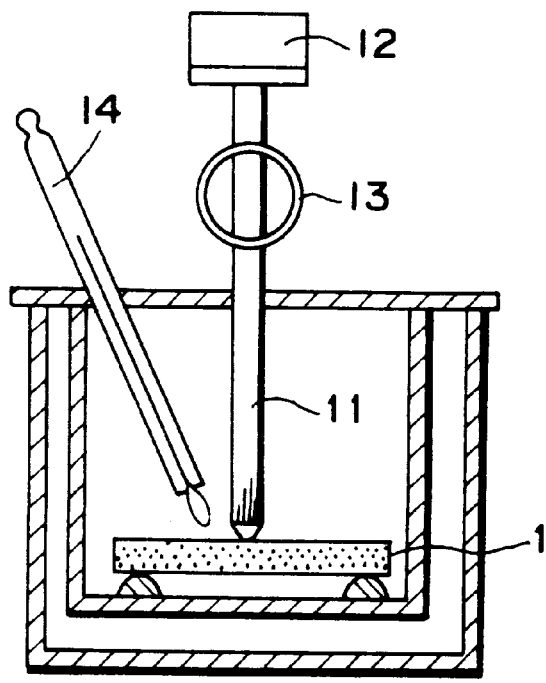
FIG. 4 is a view showing an apparatus for measuring heat distortion temperature.

The method of measuring deflection temperature was carried out in the following manner as shown in FIG. 4: A test specimen of 6.4×12.7×110 mm was supported with a 100 mm span in a heat transfer medium in a HDC (heat distribution temperature) test instrument, and loads of stress 18.5 kgf/cm$^2$ and 4.6 kgf/cm$^2$ by using a central loading bar 11 and a weight 12 were applied to the test specimen while the temperature of the heat transfer medium was raised at a rate of 2° C./min., and the temperature at which the deflection of the test specimen 1 reached 0.25 mm in wire gauge 13 was measured by thermometer 14.

TABLE 9

| Average alumina | | Heat Distortion Temperature (° C.) | | | |
|---|---|---|---|---|---|
| particle diameter ($\mu$m) | | 0.7 | 2 | 20 | 30 |
| Resin content (vol-%) | 20% | Not moldable | Not moldable | Not moldable | Not moldable |
| | 30% | >300 | >300 | >300 | >300 |
| | 40% | 273 | 284 | 264 | 289 |
| | 50% | 257 | 232 | 225 | 220 |
| | 60% | 204 | 197 | 192 | 189 |
| | 70% | 204 | 197 | 192 | 189 |
| | 80% | Deformed | Deformed | Deformed | Deformed |

As can be seen from Table 9, all test specimens containing phenol resin within the range of 30 to 70 vol-% have heat distortion temperatures of 150° C. or more. With a phenol resin content of 20 vol-% or less, the pressed compacts after pressing at ordinary temperature could not maintain its shape. Further, a content of 80 vol-% or more is not practical because the pressing compact was deformed in heating to harden it to fail to maintain its shape.

Further, as the content of phenol resin is decreased with an increasing content of alumina, the heat distortion temperature is increased. The deflection temperature of phenol resin itself is generally 160° C. and thus it is understood that the heat distortion temperature can be increased significantly by addition of alumina powder.

Then, the same experiment was carried out where the combination of the resin and ceramic was varied. Table 10 shows the combination of phenol resin-silica (SiO$_2$); Table 11, the combination of phenol resin-steatite (MgO.SiO$_2$); Table 12, the combination of unsaturated polyester resin-alumina (Al$_2$O$_3$); and Table 13, the combination of epoxy resin-silica (SiO$_2$).

In the combination of any materials, the heat distortion temperature of the composite is increased to 150° C. or more by combination of 30 to 70 vol-% of thermosetting resin and 70 to 30 vol-% of ceramics.

TABLE 10

| Average silica | | Heat Distortion temperature (° C.) | | | |
|---|---|---|---|---|---|
| particle diameter ($\mu$m) | | 3 | 10 | 20 | 30 |
| Resin content (vol-%) | 20% | Not moldable | Not moldable | Not moldable | Not moldable |
| | 30% | >300 | >300 | >300 | >300 |
| | 40% | 262 | 275 | 269 | 282 |
| | 50% | 243 | 221 | 216 | 223 |
| | 70% | 205 | 201 | 189 | 204 |
| | 80% | Deformed | Deformed | Deformed | Deformed |

TABLE 11

| Average steatite | | Heat Distortion Temperature (° C.) | | | |
|---|---|---|---|---|---|
| particle diameter ($\mu$m) | | 0.7 | 2 | 20 | 30 |
| Resin content (vol-%) | 20% | Not moldable | Not moldable | Not moldable | Not moldable |
| | 30% | >300 | >300 | >300 | >300 |
| | 40% | 189 | 196 | 189 | 195 |
| | 50% | 185 | 189 | 184 | 179 |
| | 70% | 204 | 197 | 192 | 189 |
| | 80% | Deformed | Deformed | Deformed | Deformed |

TABLE 12

| Average alumina particle diameter (μm) | | Heat Distortion Temperature (° C.) | | | |
|---|---|---|---|---|---|
| | | 0.7 | 2 | 20 | 30 |
| Resin content (vol-%) | 20% | Not moldable | Not moldable | Not moldable | Not moldable |
| | 30% | >300 | >300 | >300 | >300 |
| | 40% | 275 | 276 | 283 | 271 |
| | 50% | 256 | 247 | 236 | 233 |
| | 60% | 212 | 216 | 206 | 209 |
| | 70% | Deformed | Deformed | Deformed | Deformed |

TABLE 13

| Average silica particle diameter (μm) | | Heat Distortion Temperature (° C.) | | | |
|---|---|---|---|---|---|
| | | 3 | 10 | 20 | 30 |
| Resin content (vol-%) | 20% | Not moldable | Not moldable | Not moldable | Not moldable |
| | 30% | 178 | 185 | 187 | 182 |
| | 40% | 178 | 182 | 182 | 182 |
| | 50% | 175 | 174 | 173 | 175 |
| | 70% | 168 | 160 | 159 | 155 |
| | 80% | Deformed | Deformed | Deformed | Deformed |

Example 4

Test on Tracking Resistance

Starting powdery mixtures, which are phenol novolak resin and alumina and mullite ($3Al_2O_3.2SiO_2$) as ceramic fillers, were mixed at the ratios with the average ceramic particle diameters as shown in Tables 14 and 15, then subjected to powder compression molding at ordinary temperature and heat treated at 80 to 250° C., whereby test specimens of the hardened resin composite were produced.

The resulting test specimens were determined for heat distortion temperature according to the method of JIS K7207 in the same manner as in Example 3 and for tracking resistance according to the IEC Pub 112 method.

Figure 5:
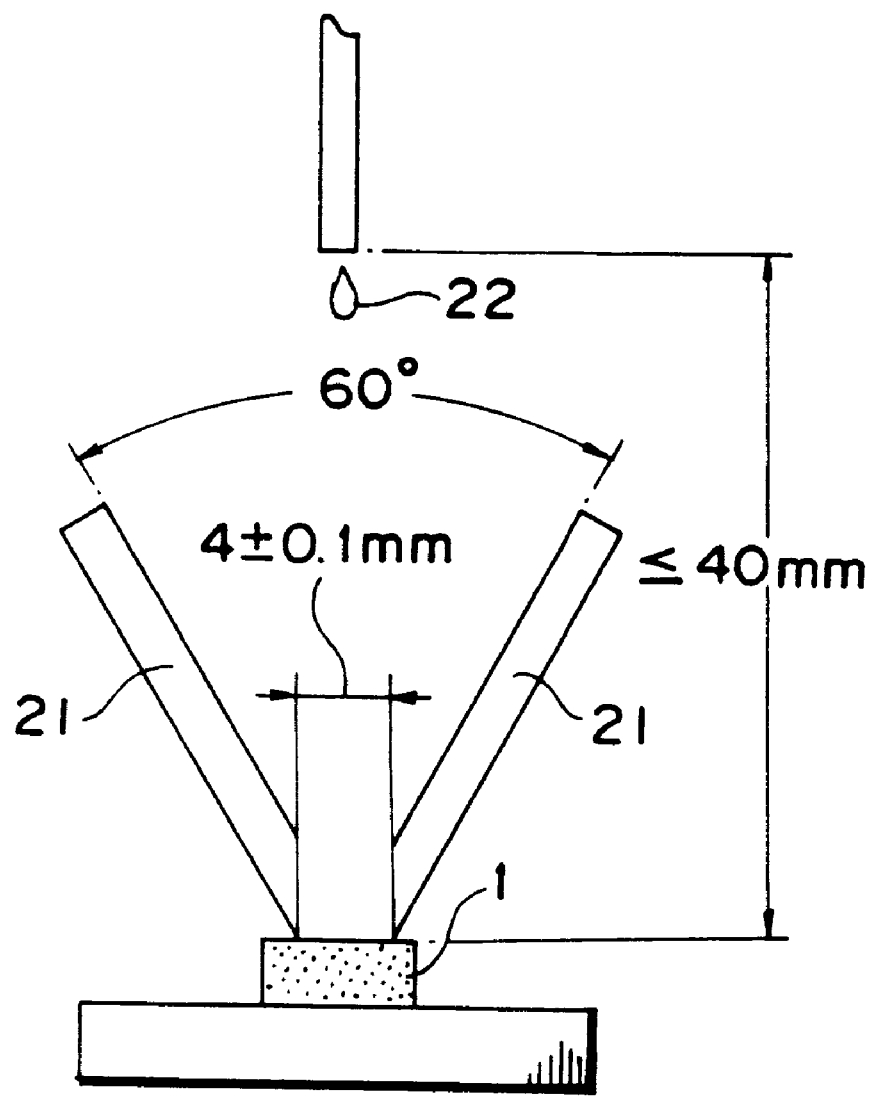
FIG. 5 is a view showing an apparatus for measuring tracking resistance.

The results are shown in Tables 14 and 15. For measurement of tracking resistance, as shown in FIG. 5, two platinum electrodes 21, 21 were attached onto the test specimen 1 with a pressure bonding loading of 1N, and alternating voltage was applied between electrodes 21, 21. In this state, droplets of a test solution 22 containing 0.1% $NH_4Cl$ was fallen between electrodes 21, 21 every 30 seconds until the test specimen was destroyed by tracking (the electric current of 0.5 A was passed for 2 seconds). A graph was made of the results, and the voltage causing electrical breakdown by 50 droplets was determined as Comparative Tracking Index (CTI) for tracking resistance.

TABLE 14

| | | Comparative example | | | Example | | | |
|---|---|---|---|---|---|---|---|---|
| Sample No. | | 1 | 2 | 3 | 4 | 5 | 6 | 7 |
| Mixing ratio | Phenol novolak resin (vol-%) | 50 | 40 | 80 | 60 | 50 | 40 | 30 |
| | Alumina | 50 | 60 | 20 | 40 | 50 | 60 | 70 |

TABLE 14-continued

| | Comparative example | | | Example | | | |
|---|---|---|---|---|---|---|---|
| Sample No. | 1 | 2 | 3 | 4 | 5 | 6 | 7 |
| Average alumina particle diameter (μm) | 18 | 18 | 3 | 3 | 3 | 2 | 2 |
| tracking resistance (V) | 175 | 200 | 175 | 250 | 250 | 275 | 250 |
| Heat distortion temperature (° C.) | 200 | 200 | 180 | 200 | 200 | 220 | 245 |
| Moldability | ○ | ○ | ○ | ○ | ○ | ○ | ○ |
| Shape retention after thermal treatment | ⊙ | ○ | Δ | ○ | ⊙ | ⊙ | ○ |
| Solder thermal resistance (260° C. x 5 sec.) | Δ | Δ | X | ○ | ○ | ⊙ | ⊙ |

TABLE 15

| | | Comparative example | | | Example | | |
|---|---|---|---|---|---|---|---|
| Sample No. | | 8 | 9 | 10 | 11 | 12 | 13 |
| Mixing ratio | Phenol novolak resin (vol-%) | 50 | 40 | 80 | 60 | 50 | 45 |
| | Mullite | 50 | 60 | 20 | 40 | 50 | 55 |
| Average alumina particle diameter (μm) | | 18 | 18 | 3 | 2 | 2 | 2 |
| tracking resistance (V) | | 175 | 225 | 175 | 250 | 250 | 275 |
| Heat distortion temperature (° C.) | | 200 | 200 | 180 | 200 | 220 | 220 |
| Moldability | | ○ | ○ | ○ | ○ | ○ | ○ |
| Shape retention after thermal treatment | | ⊙ | ○ | Δ | ○ | ⊙ | ⊙ |
| Solder thermal resistance (260° C. x 5 sec.) | | Δ | Δ | X | ○ | ○ | ⊙ |

As can be seen from Tables 14 and 15, test specimens (Nos. 1, 2, 8 and 9) where an average particle diameter of alumina is more than 5 μm and test specimens (Nos. 3 and 10) where the mixing ratio of resin and ceramic is outside of the range of the present invention are low in voltage for tracking resistance, and the voltage does not reach 250 V. In particular, test specimens (Nos. 3 and 10) with a resin content exceeding 70 vol-% are understood to be also low in heat distortion temperature under load.

On the other hand, those with the range of the present invention (Nos. 4 to 7 and Nos. 11 to 13) indicated excellent results of as high tracking resistance as 250 V or more and a high heat distortion temperature as 200° C. or more. The tracking resistance of phenol resin itself is generally 130 V or thereabouts, so it is understood that tracking resistance can be significantly improved by adding ceramic powder.

According to the present invention, a powder comprising 10 to 70 vol-% of thermosetting resin such as epoxy, phenol resin, etc. and the remainder being fillers with a particle diameter of 40 μm or less is granulated and then subjected to powder compression molding at ordinary temperature, followed by thermal hardening, so that a resin composite material with high accuracy being excellent in thermal resistance and electric characteristics and being rendered excellent in sliding properties by providing uniform pores therein can be provided in a very simple production step.

What is claimed is:

1. A molded article formed from a resin composite comprising 10 to 70 vol-% of thermosetting resin and the balance being fillers with an average particle diameter of 40 μm or less, said molded article having pores with an average diameter of 15 to 80 μm and occupying 3 to 30% of its cross-sectional area.

2. The molded article according to claim 1, wherein the accuracy or dimension of the molded article is within the range of ±2.0% of its central standard value.

3. The molded article according to claim 1, wherein the surface of the molded article is free of finely uneven portions.

4. The molded article according to claim 1, wherein the molded article is composed of resin particles and fillers distributed around said resin particles.

5. The molded article according to claim 1, wherein the amount of the resin ranges from 10 to 40 vol-%.

6. The molded article according to claim 1, wherein said fillers are organic or inorganic particles or fibers.

7. The molded article according to claim 1 wherein the resin composite has a heat distortion temperature of 150° C. or more and tracking resistance of 250 V or more.

* * * * *